Aug. 30, 1955   R. J. EHRET   2,716,686
ELECTRIC CONTROL APPARATUS
Original Filed May 5, 1950
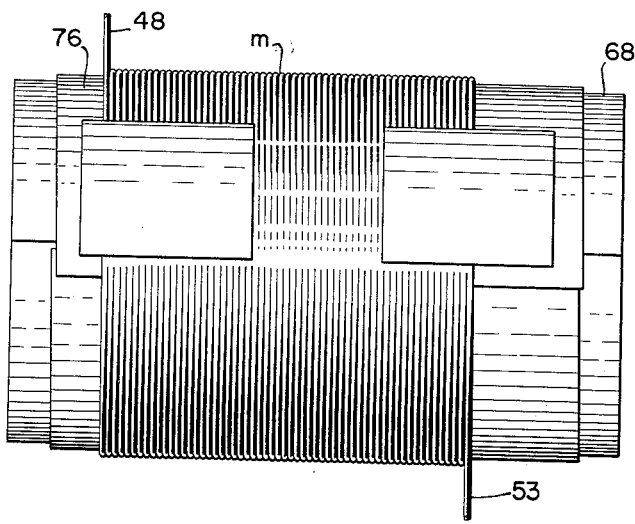
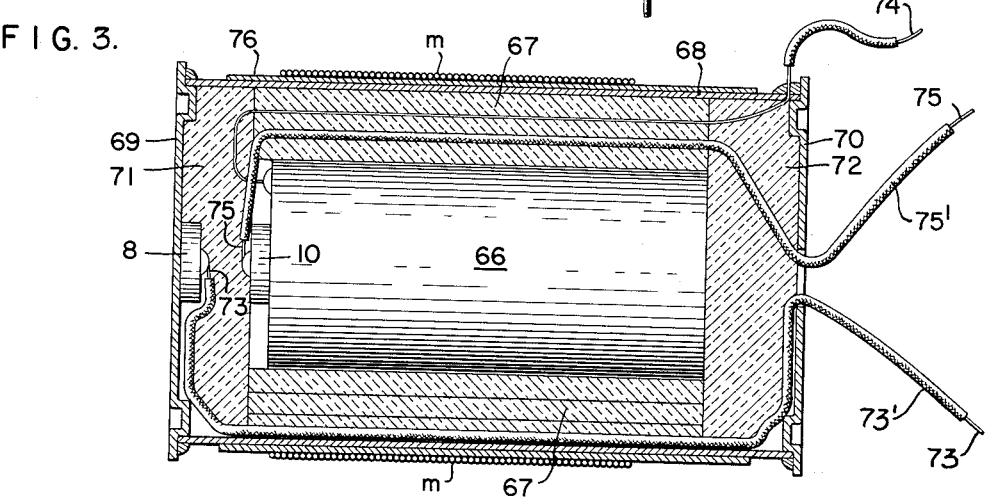
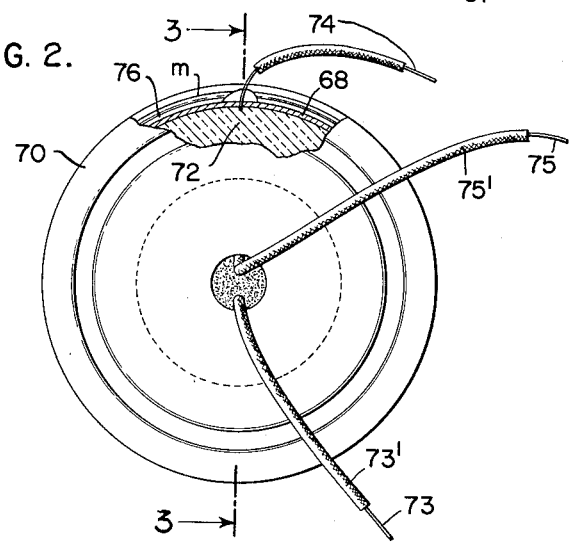
*INVENTOR.*
ROBERT J. EHRET
BY *Arthur H. Swanson*
ATTORNEY.

United States Patent Office 2,716,686
Patented Aug. 30, 1955

2,716,686

ELECTRIC CONTROL APPARATUS

Robert J. Ehret, Philadelphia, Pa., assignor to Minneapolis-Honeywell Regulator Company, Minneapolis, Minn., a corporation of Delaware Original application May 5, 1950, Serial No. 160,158, now Patent No. 2,694,169, dated November 9, 1954. Divided and this application November 23, 1953, Serial No. 393,680

3 Claims. (Cl. 201—63)

The present invention relates to a control device of the thermal type, and particularly to a thermal unit including thermally related electrical heating means and temperature responsive resistors, and having utility in controlling automatic reset actions in electric control apparatus of the thermal bridge type.

This invention is a division of my prior application, Serial No. 160,158, filed on May 5, 1950, now Patent No. 2,694,169 of November 9, 1954. Said patent discloses and claims improved measuring and controlling apparatus for electrically effecting proportional control with automatic reset action, consisting of a novel and effective combination of electrical means for automatically or manually effecting proportional control of a variable quantity such as temperature, with electrical means for electrically modifying the proportional control action by reset action. The modified control action thus produced is dependent upon the direction and magnitude of the departure of the controlled variable from a normal or set-point value of the latter, and upon the duration of the period during which the departure has continued.

The present invention was primarily devised for use in a reset device so that the reset action is produced and regulated by heating action of regulated heating currents passed through heating elements thermally associated with temperature responsive resistors which decrease in resistance in a predetermined manner as their temperatures are increased.

Thus, an object of the present invention is to provide a novel structural assemblage comprising two temperature responsive resistors and a heating element arranged in such manner that one resistor will heat up more rapidly than the other even though the two temperature responsive resistors are so formed as to have similar resistances when at the same temperature, and are so arranged that in each prolonged reset action, both resistors will ultimately attain the same maximum temperature.

In a preferred embodiment of the invention, this novel structural assemblage for producing a desired reset action comprises a pair of similar temperature responsive resistors, a metallic container enclosing said resistors, heat insulation material thermally isolating one of said resistors from said container and from the other resistor, and electric heating means for heating said container and thereby said resistors at dissimilar rates, said electrical heating means comprising a heating wire wound about said container.

The various features of novelty which characterize my invention are pointed out with particularity in the claims annexed to and forming a part of this specification. For a better understanding of the invention, however, its advantages, and specific objects attained with its use, reference should be had to the accompanying drawings and descriptive matter in which I have illustrated and described a preferred embodiment of the invention.

Of the drawings:

Fig. 1 is an enlarged side elevation of a thermal unit according to the present invention comprising two temperature responsive resistors and a heating resistor;

Fig. 2 is an end elevation of the unit shown in Fig. 1; and

Fig. 3 is a section on the line 3—3 of Fig. 2.

The thermal unit shown in Figs. 1, 2, and 3 comprises a copper rod 66 to one side of which a first or slow temperature responsive resistor 10 is soldered. A sheet of glass wool or analogous heat and electrical insulation material 67 is spirally wound about the rod. The copper rod 66, with the insulating layer 67 wound about it, is inserted in a cylindrical copper receptacle or can 68. The ends of the cylinder 68 are closed by copper end discs or heads 69 and 70, soldered to the ends of the cylinder. A second or fast temperature responsive resistor 8 is soldered to the inner side of the end disc 69. A mass of glass wool 71 or analogous insulating mterial is interposed between the disc 69 and the adjacent end or the rod 66 and insulation material 67 wound about the rod 66. A similar insulation mass 72 is interposed between the disc 70 and the adjacent ends of the rod 66 and insulation layer 67.

A terminal conductor 73, soldered to the inner side of the fast resistor 8, and electrically insulated from the can 68, passes along the inner side of the latter to and through the insulation mass 72 and then out of the can 68 through its end wall 70. The second terminal of the fast element 8 is formed by the metallic can 68. A terminal 74, soldered to the can 68 and also to the end of the rod 66, extends longitudinally of the thermal unit between adjacent inner and outer convolutions of the insulation material 67 into and through the insulating mass of material 72. A terminal 75, soldered to the end of the resistor 10 remote from the rod 66, similarly passes to and between adjacent convolutions of the insulating material 67 and the insulation mass 72 through the disc 70. As shown, the portions of the terminals 73 and 75 passing through the insulating material 72 in proximity to the copper rod 66 and then passing through the disc 70 are surrounded by electrical insulation tubes 73' and 75', respectively.

The outer cylindrical wall of the receptacle 68 is surrounded by electrical insulation material 76 on which a heating resistor $m$ is wound with its terminals 48 and 53 extending away from the unit. The heating resistor $m$ may consist of fine wire, and may have a resistance of 17,000 ohms. The resistance of the individual resistor elements 8 and 10, when at a temperature of 100° F., may well be of the order of 30,000 to 50,000 ohms, and may diminish to an operative minimum of the order of 1000 ohms when heated to a temperature of 265° F.

A practically important feature of the invention is the enclosure of the fast and slow resistors 8 and 10 in a single can in the manner illustrated in Figs. 1, 2, and 3, so that the only significant temperature difference between the two temperature responsive resistors in the can is that due to the greater thermal inertia of the slow resistor as a result of the relatively low heat transfer coefficient between the heating resistor and slow resistor in the can and the heat storage capacity of the copper rod 66 in the can. The inclusion of associated fast and slow temperature sensitive resistors 8 and 10 along with the associated heating resistor $m$ in the same metallic can or unit receptacle is of much practical importance and contributes directly and materially to the excellent overall performance and operative results obtained with the measuring and control apparatus of my aforementioned patent. With the resistors of the unit enclosed in the same can or metallic receptacle, the unit is made immune to thermal gradients which have been found to be practically objectionable in apparatus heretofore proposed including fast and slow resistors for use in obtaining reset action.

While, in accordance with the provisions of the statutes, I have illustrated and described a preferred embodiment of the present invention, those skilled in the art will understand that changes may be made in the form of the apparatus disclosed without departing from the spirit of my invention as set forth in the appended claims, and that some features of the present invention may sometimes be used with advantage, without a corresponding use of other features.

Having now described my invention, what I claim as new and desire to secure by Letters Patent, is:

1. A reset delay unit comprising a pair of similar resistors, a metallic container enclosing said resistors, heat insulating material isolating one of said resistors from said container and from the other resistor, and electrical heating means for heating said container and thereby heating said resistors at dissimilar rates.

2. A reset delay unit comprising a pair of resistors, a metallic container enclosing said resistors, heat insulation material thermally isolating one of said resistors from said container and from the other resistor, and electrical heating means comprising a wire wound about said container.

3. A reset delay unit comprising a pair of similar resistors, a mass of heat conducting metal associated and in good heat transfer relation with one of said resistors, electrical heating means for heating said resistors, and heat insulation material isolating said mass and the associated resistor in good heat transfer relation therewith from the other resistor, whereby the latter will heat up more rapidly than the resistor associated with said mass.

No references cited.